Jan. 13, 1953 W. O. FROHRING 2,625,152
VIBRATOR WITH AMPLITUDE MEASURING CIRCUIT
Filed March 20, 1951

*INVENTOR.*
WILLIAM O. FROHRING
BY
Hyde, Meyer, Baldwin & Doran
ATTORNEYS

Patented Jan. 13, 1953

2,625,152

UNITED STATES PATENT OFFICE 2,625,152

VIBRATOR WITH AMPLITUDE MEASURING CIRCUIT

William O. Frohring, Newbury Township, Geauga County, Ohio

Application March 20, 1951, Serial No. 216,534

4 Claims. (Cl. 128—2)

The invention relates to clinical diagnostic instruments for determining, quantitatively, the sensitivity of a patient to applied vibrations or related impulses of varying magnitude. It relates particularly to novel and improved mechanism for accurately, quantitatively determining the magnitude of vibrations applied to various parts of the body under varying conditions for the purpose of determining the threshold of sensitivity of such parts, and thereby diagnosing certain abnormal physical conditions such as neurologic disorders, and prescribing a remedy therefor.

In this specification and the appended claims I shall use the terms "threshold of appreciation of vibration" to denote the first sensation of vibration of which a patient becomes aware as the kinetic characteristics such as the amplitude or the frequency of vibration are increased from an imperceptible value to one which is just perceptible to the said patient while the vibrating element is in contact with some part of the body. It will be readily appreciated, of course, that this threshold of appreciation of vibration varies from one location to another on the body, some exterior parts being considerably more sensitive than others.

It is now well established that the reaction of a subject to applied vibration can be used as a basis for drawing certain conclusions as to a subject's physical condition. The present method usually involves desensitizing the area under test by a vibration of relatively high amplitude so as to at least partially impair the subject's threshold of appreciation of vibration in said area, and thereafter, by successive determinations at fixed, spaced intervals, observing in quantitative fashion, the recovery of the said area by means of a suitable succession of threshold tests. Since the region where the test is being made is normally gradually recovering from the desensitizing treatment, each successive test will give a threshold sensitivity involving a lower amplitude or frequency of vibration and a chart may be plotted to graphically illustrate, quantitatively, both the rate of recovery and also the absolute sensitivity of any particular area under any condition, which absolute sensitivity may be rotatably compared with that of other patients, similarly tested.

Previous efforts along this line have consisted largely of subjective tests. For example, a tuning fork while starting to vibrate at some predetermined amplitude has been placed in contact with a patient's skin, the patient being requested to tell when the vibratory sensation disappears. The errors arising with this method are enormous. It is quite difficult to prevent damping of the amplitude of vibration by various factors including the gripping of the fork stem by the diagnostician and the extent of pressure of the fork against the region being tested. This latter factor, namely the amount of pressure exerted, has a disturbing effect on both the frequency and amplitude of vibration, regardless of the type of vibrator used. The time decay for any particular fork depends on the initial amplitude and the logarithmic decrement of the fork. The more usual present method is to apply vibrations of controlled amplitude and frequency by means of an electrically energized vibrator, which of course is also a subjective test, but a more accurate one.

The amplitude of vibration of one conventional type electrical vibrator which was used in present tests is proportional to the square of the applied voltage. At first thought it would seem feasible to merely read the applied voltage on this type vibrator and calculate therefrom the presumed amplitude. Errors can easily creep in during practice under this method as a result of either fluctuations in voltage after the test begins, or failure of the vibrating element to properly respond to the applied voltage, by reason of mechanical defects. It has been determined that the relative amplitude of motion at a given driving voltage is changed as much as 10% to 15% depending on the previous handling of the vibrator.

An additional possibility of error in determining the amplitude of the applied vibration resides in the choice of the portion of the body which is used as a test spot. Various test areas cause changes in acoustic impedance which are reflected back on the vibrator driving force and actually change the amplitude of vibration for a given driving power. The amplitude over a bony spot, for example, may be materially greater than over a fleshy spot.

In view of these and other factors leading to error in the determination of the actual amplitude of vibration at any particular moment during the test sequence, I have devised a means for indicating the actual amplitude of vibration, which means accurately responds to momentary or extended variations in such amplitude, and which constitutes the principal object of the present invention.

Another object of the invention is to provide compact means which can be attached directly to the vibrator element, which is sensitive to the frequency and amplitude of the vibration, and which, in conjunction with suitable indicating and/or recording means, gives an instantaneous and accurate quantitative measure of the amplitude of the vibration.

Other objects and advantages will be apparent from a study of the following specification, in conjunction with the accompanying drawings, in which.

Speaking first generally, my invention comprises the attachment of a piezo-electric crystal, such as a suitable Rochelle salt crystal of the "bender" type, to the vibrating element, and the linkage of said crystal, by suitable electric circuit means, through electronic amplifying equipment, to a suitable voltmeter.

As is known to those skilled in the electrical arts, application of an alternating deforming force to a piezo-electric crystal results in the development of electrical charges which are proportional to the frequency of reversion of the deforming force, the severity thereof, and the orientation of the characteristic axes of the crystal with respect to the direction of application of the force. As long as the crystal is carried directly by the vibrating element or its supports, it responds instantaneously to reversals of direction of movement of the vibrator, as will appear, and it is immediately evident that variations in frequency or amplitude of the vibrator, no matter how caused, will be reflected in the characteristics of the potential developed on the crystal. Errors caused in former technique by fluctuations of voltage, mishandling of the apparatus, use of the vibrator on unequally absorptive portions of the body, etc., are entirely eliminated by the means I herein disclose since the characteristics of the potential variations in the crystal are indicated on a suitable indicating voltmeter immediately as they are developed. The operator may either compensate, by means of drive control, so as to produce a uniform amplitude, or he may record and plot the actual varying amplitude without attempting to compensate for it.

Figure 2:
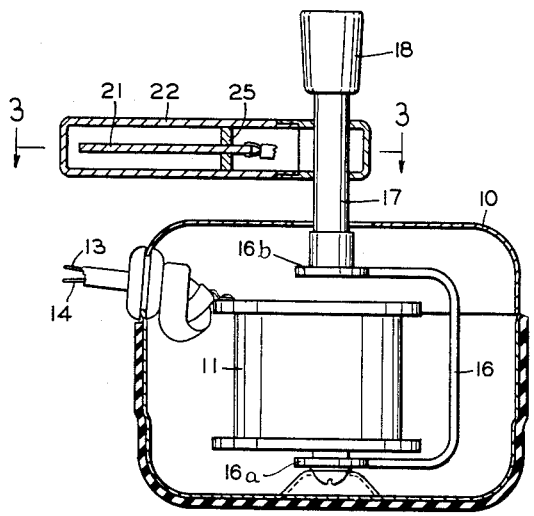
Fig. 2 is a view, somewhat enlarged and in section, showing details of the vibrator unit.

Referring first to Fig. 2, there is shown a housing 10 containing a coil 11 energizable from an alternating current power source 12 (Fig. 2) through leads 13 and 14. The structure within housing 10 is previously known, but will be briefly characterized. The coil is supported on the lower cross arm 16a of a yoke 16 of somewhat resilient metal such as spring steel. The upper cross arm 16b carries an upwardly extending stem 17 which passes freely through the housing, and has on its end an applicator knob 18. As the varying pulses of the alternating current pass through coil 11, the part 16b is intermittently attracted by the coil and in each half cycle as the alternating flux falls to zero the inherent resilience of the yoke causes the part 16b to return towards its idle position. The lower cross arm 16a is retained with respect to the housing by fastening means (not shown).

The vibrator unit is easily carried in the hand, and the power lead wires (as well as the crystal lead wires soon to be described) are long enough so that the unit can be freely moved to apply treatments to a patient disposed in a suitable position near the apparatus.

Figure 3:
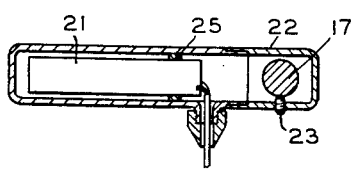
Fig. 3 is a sectional view taken on the line 3—3 of Fig. 2.

A Rochelle salt crystal 21 is supported in a housing 22 which is fixed by means of set screw 23 (Fig. 3) to stem 17. In the present instance the crystal is fairly long in relation to its width and thickness, and it is gripped rigidly near one end in anchoring means 25 which is fixed with respect to housing 22. The mounting might be termed the cantilever type, and if stud 17 and housing 22 are vibrated rapidly in reciprocating fashion, the inertia of the free end of the crystal will tend to cause said free end to maintain its position in space while the gripped end necessarily vibrates. Opposed crystal faces in the plane of reciprocation are consequently alternately in tension and compression due to flexure of the crystal in said plane, so that an alternating voltage is developed on said opposed faces.

It may easily be shown by tests that the voltage thus generated is a direct measure of the amplitude of vibration. Absolute calibration of the crystal pickup can be accomplished by observing a point of light reflected from a bright spot on the vibrating crystal support. Such point, in rapid vibration, delineates a straight line of length dependent on the amplitude of vibration, the length bearing an arithmetical relation to such amplitude. A micrometer microscope can be used for length measurements. At the same time the output voltage of the crystal is measured by an electronic voltmeter. The sensitivity of the device is determined from these measurements.

In averaging a plurality of tests on units of this type it has been found that the sensitivity of response is .01 centimeter per volt. Since the lowest observable voltage on one typical voltmeter is .001 volt, a unit such as I have described can easily measure a vibrator applicator displacement (that is to say, amplitude of vibration) of about .00001 centimeter. While auxiliary equipment can be furnished to observe smaller displacements, such extreme sensitivity is not necessary for threshold measurements.

Figure 1:
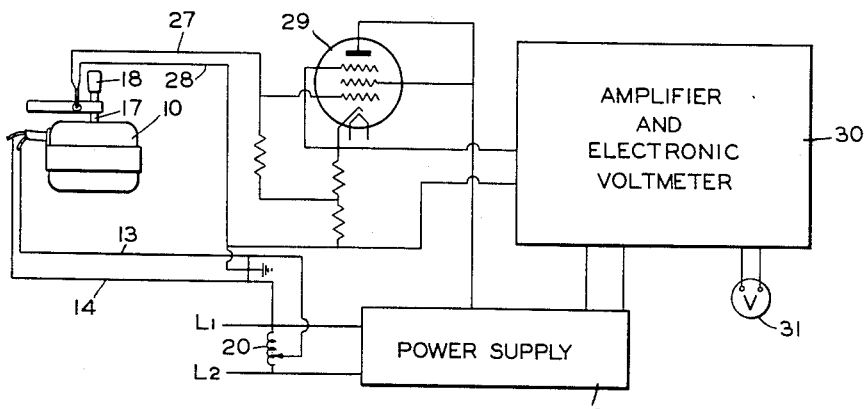
Fig. 1 is a schematic representation of a vibrator with accompanying elements, in accordance with my invention.

Referring to Fig. 1, the alternating voltage developed on the crystal is applied to lead wires 27 and 28, said wires being in electrical current flow communication respectively with the grid and cathode of an electronic tube 29. The tube output is fed to a multistage electronic amplifier system 30, the eventual potential being indicated on the voltmeter 31. Such amplifier is conventional, as also is the construction of the power pack 12 which can take its energizing current from the ordinary domestic power supply leads $L_1$ and $L_2$.

A variable rheostat 20 with conventional control knob and indicating dial are usually provided for controlling the driving current through leads 13 and 14 to the vibrator coil, and, as previously stated, it can be assumed for rough purposes that the amplitude is proportional to the square of this applied voltage, but the actual and accurate quantitative value of the amplitude, at each moment of the test, is determinable from the electronic voltmeter 31. In this way I obtain far greater accuracy than ever before obtained in diagnoses of the nature hereinabove described.

It will be obvious that the amplitude readings which are directly readable or directly determinable from the electronic voltmeter 31 represent the actual amplitude of vibration of the applicator 18 at the exact moment of the reading.

The crystal unit is of relatively insignificant weight so as to have little or no effect on the presought amplitude as securable by means of the voltage control of the vibrator drive. The crystal unit can be easily and quickly applied to the stem 17 of the usual commercially obtainable vibrator by merely unscrewing the applicator tip 18 and slipping the crystal unit on the stem.

What I claim is:

1. In a vibrator unit having an applicator member, and a power source for imparting vibratory motion to said member, amplitude measuring means for instantaneously determining the amplitude of vibration of said member comprising a piezo-electric crystal fixed with respect to said member so as to vibrate therewith, whereby inertia flexures are produced in said crystal, and resulting potential differences are generated in said crystal proportional to the amplitude of vibration, and means for measuring and indicating the value of such potential differences.

2. Amplitude measuring means as defined in claim 1 wherein said vibrator unit is provided with a vibratable stem, the applicator member being fixed on the tip end of said stem, and the crystal having a part fixed with respect to said stem and adjacent said applicator.

3. Amplitude measuring means as defined in claim 1 wherein the measuring and indicating means includes a single stage electronic tube amplifier, and a voltmeter sensitive to the voltage output from said amplifier and adapted to indicate the value of such voltage output.

4. In a vibrator unit having an applicator member, and a power source for imparting vibratory motion to said member, amplitude measuring means for instantaneously determining the amplitude of vibration of said member comprising a stem rigidly connected to said member so as to vibrate therewith, a piezo-electric crystal of elongated form having one end fixed with respect to said stem, the other end of said crystal being free so as to offer inertia resistance to vibration whereby flexures are produced in said crystal, and resulting potential differences are generated in said crystal proportional to the amplitude of vibration, electric circuit means for introducing said potential differences to a multistage electronic tube amplifier, and a voltmeter sensitive to the voltage output from said amplifier and adapted to indicate the value of such voltage output.

WILLIAM O. FROHRING.

REFERENCES CITED

The following references are of record in the file of this patent:

UNITED STATES PATENTS

| Number | Name | Date |
|---|---|---|
| 2,561,084 | Wickham | July 17, 1951 |